United States Patent [19]

Onishi et al.

[11] Patent Number: 4,484,806
[45] Date of Patent: Nov. 27, 1984

[54] AUTOMATIC FOCUSSING APPARATUS

[75] Inventors: Masami Onishi, Kyoto; Yoshinori Kitamura, Katano; Shoji Nishikawa, Neyagawa, all of Japan

[73] Assignee: Matsushita Electric Industrial Co., Ltd., Kadoma, Japan

[21] Appl. No.: 488,605

[22] Filed: Apr. 25, 1983

[30] Foreign Application Priority Data

Apr. 28, 1982 [JP] Japan ............................... 57-72107
Apr. 28, 1982 [JP] Japan ............................... 57-72108
Apr. 28, 1982 [JP] Japan ............................... 57-72109
Jun. 9, 1982 [JP] Japan ............................... 57-99651
Jan. 20, 1983 [JP] Japan ............................... 58-8430

[51] Int. Cl.³ .............................................. G03B 3/10
[52] U.S. Cl. .................................... 354/404; 358/227
[58] Field of Search .................. 354/400, 402, 404; 358/227

[56] References Cited

U.S. PATENT DOCUMENTS

4,370,038 1/1983 Kimura ............................... 354/404

Primary Examiner—Russell E. Adams
Attorney, Agent, or Firm—Cushman, Darby & Cushman

[57] ABSTRACT

The present invention relates to an automatic focussing apparatus for a television camera using video signal and comprises a variable optical path means, for example, an optical glass and a piezo-electric device disposed in an optical pass, and the automatic focussing apparatus varies minutely an optical path length responding to given frequency and controls lens position using a given frequency component which is derived from a high frequency component in said video signal in a manner that said high frequency component becomes maximum.

11 Claims, 17 Drawing Figures

AUTOMATIC FOCUSSING APPARATUS

BACKGROUND OF THE INVENTION

1. Field of the Invention

The present invention relates to an automatic focussing apparatus particularly suitable for use in a television camera.

2. Description of the Prior Art

Figure 1:
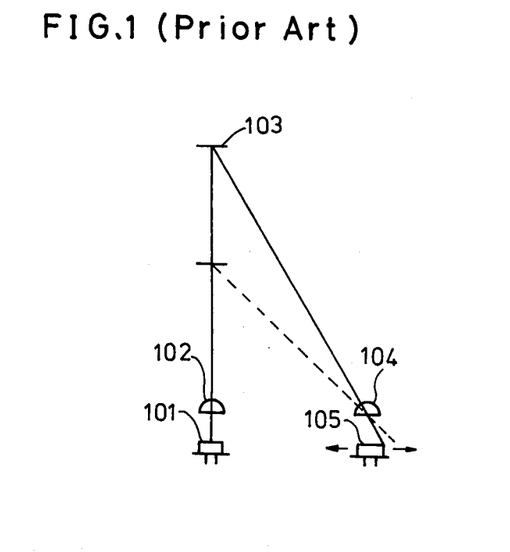
FIG. 1 is an outline view showing the conventional method detecting a distance using a trigonometrical survey.

Hitherto, for an automatic focussing apparatus, an apparatus which measures a distance to an object by emitting infrared rays against an object and receiving the reflected infrared rays to measure distance and drives the lens mechanism for focussing, has been known. Such apparatus can measure the distance accurately to the object. However, for moving the lens accurately in accordance with the distance, the lens mechanism for focussing needs to be assembled accurately. The principle of the measure using the infrared rays is shown in FIG. 1. That is, the light emitting diode 101 emitts infrared rays and the lens 102 condenses the infrared rays. The lens 104 condenses the infrared rays reflected by the object 103. The photodiode 105 receives the reflected infrared rays. The position of the photodiode 105 shifts corresponding to the distances to the object as shown by a real line and a broken line in FIG. 1. Accordingly, the distance to the object can be measured by using the position of the photodiode 105, and the lens mechanism for focussing is driven in accordance with the distance. Therefore, the lens mechanism for focussing is required to be assembled with a high precision.

Also, there is a known art for making the lens mechanism for focussing without need of such precision, by using a feedback loop of an automatic focussing apparatus system. Such automatic focussing apparatus system is explained as follows using FIG. 2(a). The rays reflected by the object passes through a lens 1. The image tube 2 converts the photo-signal concerning the object into an electric signal. The pre-amplifier 3 amplifies the electric signal obtained by the image tube 2 and the processing circuit 4 makes $\gamma$-correction, blanking process (BLK) and adds a synchronization signal (SYNC), etc. The synchronization signal generator circuit 5 supplies a synchronization signal (SYNC), a blanking signal (BLK), a vertical driving signal (VD) and a horizontal driving signal (HD), etc . . . A deflection circuit 6 deflects an electron beam. A high frequency component detector 7 detects a high frequency wave component from the output signal of the pre-amplifier 3 and, for example, a band-pass filter 7 with center frequency of 1 MHz is used. A motor 12 makes the lens 1, of the lens mechanism for focussing, wobbly by using a signal produced from a given frequency generator circuit which continually changes the state of the focussing of the lens 1. Therefore, the output signal of the band-pass filter 7 includes a component effected by the above-mentioned change of the state of the focussing of the lens 1. A given frequency component detector 10 detects a given frequency component from the output of the band-pass filter 7, the given frequency component resulting from the wobble of the lens 1. A synchronous detector 9 detects a polarity and an amplitude of the given frequency component and adds the output signal to a motor controlling circuit 11. The motor controlling circuit 11 controls the motor 7 responding to the polarity and the amplitude of the signal so that the amplitude of the high frequency component of the output signal of the image tube 2 is made maximum. At this maximum state, the amplitude of the given frequency component is zero, therefore this feedback loop is locked at this maximum state.

Figure 2:
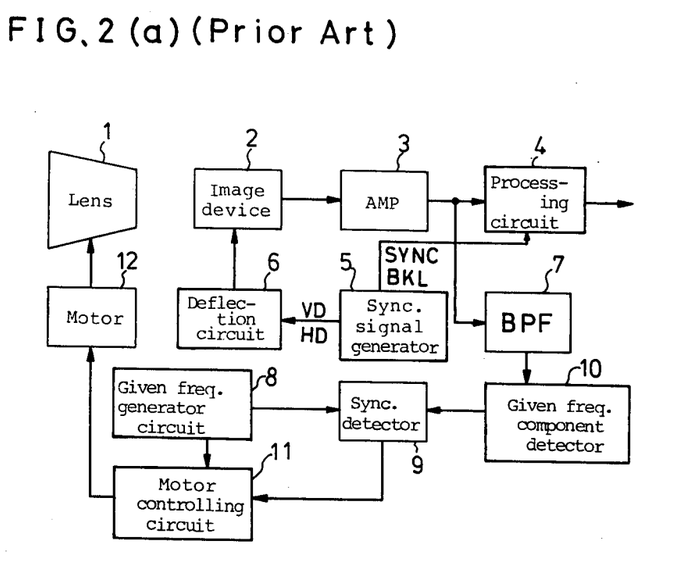
FIG. 2(a) is a block diagram showing the conventional automatic focussing apparatus of the lens motor wobble type.
FIG. 2(b) is a graph explaining an operation of the conventional automatic focussing apparatus of FIG. 2(a).

The principle of the detecting of a driving direction of the motor 12 is explained as follows, referring to the FIG. 2(b). When the object is at a distance $D_1$ and the lens 1 is transferred from a position which is in focus for a near object to a position which is in focus for a far object, as compared to the position $D_1$, the amplitude of the high frequency component of the signal output draws a solid line as shown in FIG. 2(b). In FIG. 2(b), the waves $a_1$ and $a_2$ show wobbles of the lens 1 at the given frequency. When the lens 1 is disposed at the position nearer than the position of the actual object at $D_1$, the given frequency component becomes a wave signal $b_1$ as shown in FIG. 2(b), and when the lens 1 is disposed at the position farther than the position of the actual object at $D_1$, the given frequency component becomes a wave signal $b_2$ as shown in FIG. 2(b). If the motor 12 is determined previously to transfer the lens 1 in the direction indicated by an arrow mark C, when a signal which is obtained by synchronously detecting the wave signal $b_1$ is supplied to the motor controlling circuit 11, the motor 12 transfers the lens 1 in the direction indicated by the arrow mark $C_1$. On the other hand, when a signal which is obtained by synchronously detecting the wave signal $b_2$ is supplied to the motor controlling circuit 11, the motor 12 transfers the lens 1 in the direction indicated by the arrow mark $C_2$. Therefore, the lens 1 is controlled to come to the position of the distance $D_1$ where the amplitude of the high frequency component is maximum. As mentioned above, if the lens mechanism for focussing is included in a feedback loop of the automatic focussing apparatus system, the lens mechanism for focussing is not required to be constructed precisely.

However, since the video signal of a television is obtained by scanning, if the given frequency is determined optionally, erronous focussing operation occurs.

Furthermore, if the lens 1 is disposed at a very far position from the position of the object at $D_1$, the amplitude of the high frequency component becomes very small. Therefore, in this case the amplitude of the given frequency component signal obtained by making the lens 1 wobble is smaller than that of noise and an erroneous operation occurs. Accordingly, when a diaphragm is open at its maximum or around it, a range within which the automatic focussing can be executed is very narrow, therefore the above-mentioned erroneous operation is likely to occur.

SUMMARY OF THE INVENTION

The present invention is intended to provide a feedback-type automatic focussing apparatus which modulates the high frequency component of the video signal issued from an image tube or a solid state imaging apparatus by willingly making an optical object image on the image device out of focus by vibrating the image at a given frequency which is 1/n as large as the frequency of the vertical synchronization signal of a standard television signal (n is an integer larger than 2). And the lens position is adjusted for focussing by detecting a polarity and an amplitude of the modulated signal.

And the present invention is intended primarily to provide a feedback-type automatic focussing apparatus which makes very little change of in the optical path length. The practical method is to dispose a variable optical path length means in an optical system for image formation, the device comprising plural optical prisms in which vertex angles are equal to each other, and prism vibration means. And the variable optical path length means is controlled by a signal of a given frequency. This practical method has distinct advantage with respect to life, response speed and electric power consumption.

In one embodiment, the video signal is fed to plural band-pass filters having different pass bands from each other. The lens is automatically adjusted to focus by using the given frequency component signal which is detected from an output signal of a selected one band-pass filter which is selected according to the following rule. That is, when an output level of the highest band-pass filter is lower than a predetermined level, a next lower band filter is selected, and the same step is repeated. Thus the automatic focussing apparatus of the present invention can obtain a wide range within which the focussing can be executed while not diminishing the focussing accuracy.

DESCRIPTION OF THE PREFERRED EMBODIMENTS

An automatic focussing apparatus comprising:
variable optical path means for vibrationally varying
The relative disposition relationship in an optical axis substantial direction between a focus forming position of an object and an image receiving surface of an image pick up device,
first driving means for driving said variable optical path means responding to a signal of a given frequency which is 1/n as large as a frequency of a vertical synchronization signal of a standard television signal where n is an integer larger than 2,
detecting means for detecting said given frequency component from a high frequency component derived from a video signal of said image pick-up device,
second driving means for controlling a lens by using said given frequency and an output signal of said detecting means in a manner that an amplitude of said high frequency component becomes maximum.

Incidentally, a standard television signal includes a component whose frequency is ½ of the frequency of the vertical synchronization signal on account of interlacing scanning. Therefore, the given frequency is determined 1/n as large as the vertical synchronization signal frequency (n is an integer larger than 2).

The primary feature of the embodiment of the automatic focussing apparatus of the present invention is that a glass block is disposed between the lens and the image pick up device and the optical path length between the lens and the image pickup device is varied by making the equivalent thickness of the glass block vary slightly. When the variation of the optical path length is about 10 $\mu$m, the variation of an image on a cathode-ray tube of T.V. cannot be recognized by human eyes, although the given frequency component can be detected.

Figure 3:
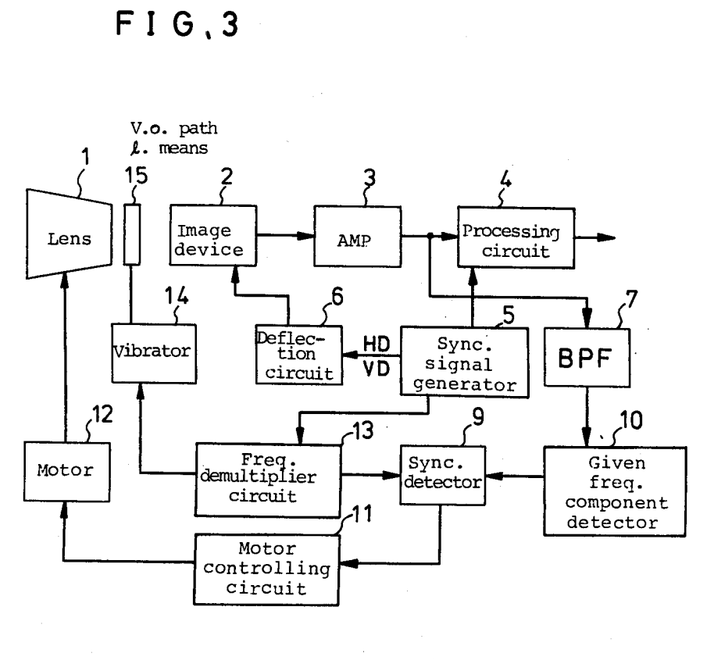
FIG. 3 is a block diagram showing an embodiment of the present invention.

The first embodiment of the present invention shown in FIG. 3 is as follows. The parts indicated by numerals 1 to 7 and 9 to 12 in FIG. 3 correspond to the parts designated by the same numerals in FIG. 2(a), and the corresponding parts operate in the same way. In the embodiment in FIG. 3, the vertical synchronization signal of the synchronization signal generator circuit 5 is multiplied by 1/n (n is an integer larger than 2) by a frequency demultiplier circuit 13 and the output of the frequency demultiplier circuit 13 drives a vibrator 14. The vibrator 14 drives the variable optical pass lenth means 15 which is made of glass and disposed between the lens 1 and the image tube 2. As a result, the amplitude of the high frequency component in the output signal of the image tube 2 is varied in accordance with the multiplied frequency. The given frequency component detector 10 detects the variation of the amplitude, and the synchronous detector 9 detects synchronously the output signal of the given frequency component detector 10 and examines the polarity of the deviation from the focus position, thereby determining the direction for driving the motor 12. The motor controlling circuit 11 controls the motor 12 in compliance with the output signal of the synchronous detector 9 so that the amplitude of the high frequency component becomes maximum. Thus the automatic focussing apparatus of this invention forms a feedback loop.

Figure 4:
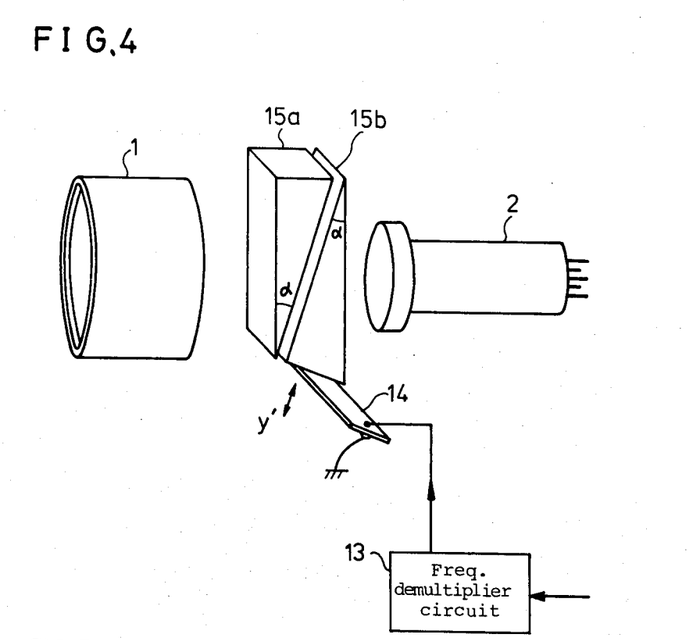
FIG. 4 is a perspective view showing an embodiment of a variable optical path length means.

The embodiment of the variable optical path lenth means is shown in FIG. 4. The parts 1, 2 and 13 in FIG. 4 correspond to the parts 1, 2 and 13 in FIG. 2, and the part 14 in FIG. 4 corresponds to one embodiment of one part 14 in FIG. 3 and the parts 15a and 15b in FIG. 4 correspond to the embodiment of the part 15 in FIG. 3. The parts 15a and 15b are optical prisms which have equal vertex angles $\alpha$ and are made of flint glass etc. The vibrator 14 is a piezo-electric device which is fixed to a base of the prism 15b and the piezo-electric device vibrates in its thickness-wise direction by being impressed with a voltage issued from the demultiplier circuit 13. An incident surface of the prism 15a and an exit surface of the prism 15b are disposed substantially perpendicular to the optical axis. And the exit surface of the prism 15a and the incident surface of the prism 15b are disposed parallel each other, and a gap d of the two prisms is selected as small as possible. The vertex angle $\alpha$ is determined so that at least an incident ray, which enters into the surface of the prism 15a at a maximum angle when the lens diaphragm is open and which is valid against the incident surface of the prism 15a is not completely reflected at the exit surface of the prism 15a. When voltage is applied to the piezo-electric device 14, the prism 15b vibrates, keeping itself parallel to the exit surface of the prism 15a, that is, maintaining the distance d constant. This operation of the prism 15b provides the variability of the thickness of the optical glass block which is disposed in an optical path. Therefore the point of focus transfers back and forth as a result of the vibration of the prism 15b. Thus it become possible to distinguish whether the position of the image formation is in front of the light receiving face of the image pick up device or in the rear of that face.

The prisms 15a and 15b in FIG. 4 are designed to be combined so that the distance d is constant when the prism 15b vibrates, and the distance d is designed as small as possible. The reason of the design is explained below with reference to FIG. 5.

Figure 5:
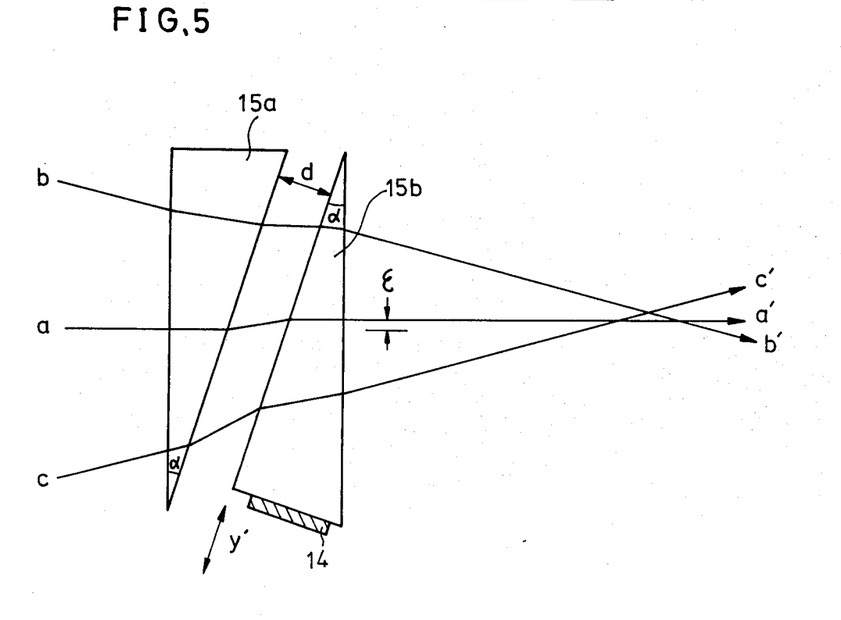
FIG. 5 is a schematic side view for explaining the embodiment of FIG. 4.

As a result of the insertion of the optical prisms in the path, rays a, b and c, which are to be focussed on the optical axis, result in the exit rays a′, b′ and c′ which do not focus just at one point as shown in FIG. 5. The reason is that there is an air gap whose distance is d and whose inclination angle is $\alpha$. The degree of being out of focus of the exit rays a′, b′ and c′ increases in proportion to the distance d. Therefore, it is preferable that the distance d be as small as possible. The ray a which is projected in parallel with the optical axis is forced to shift by distance $\epsilon$, and the shift distance $\epsilon$ is in proportion to the gap distance d. Therefore, the shift distance $\epsilon$ varies when the gap distance d varies. This results in the image on the image pick up device shifting in up-and-down directions in response to the prism vibration. Therefore, the prism 15b must be vibrated in parallel with the exit surface of the prism 15a, namely in the direction y′ so that the distance d does not vary. The upper limit of the distance d is determined based on a permissible size of a circle of confusion in focussing, namely, based on a required resolving power at a state of focussing, and the distance d needs to be smaller than 1 mm.

Figure 6:
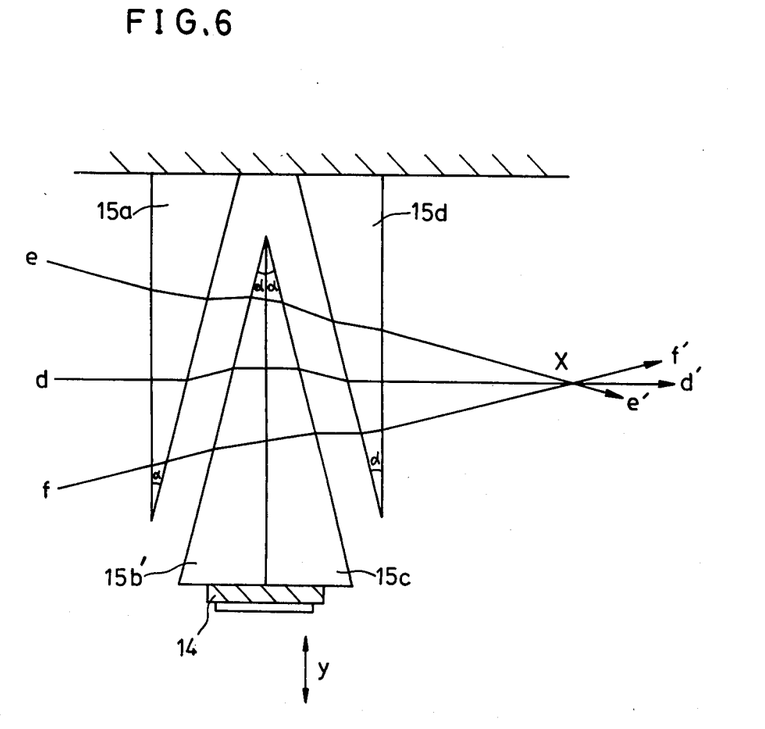
FIG. 6 is a side view showing another embodiment of the variable optical path length means.

The second embodiment of the variable optical path length means is shown in FIG. 6.

A prism 15c and a prism 15d are further added to the embodiment in FIG. 4 and FIG. 5. The vertex angles of the prisms 15c and 15d are respectively $\alpha$ which is equal to the vertex angle $\alpha$ of the prisms 15a and 15b′. And the piezo-electric device 14 is fixed to both the prism 15b′ and the prism 15c, so that the prisms 15b′ and 15c are vibrated in the direction y at the same time. The distance of the first air gap formed by the prism 15a and 15b′ is equal to the distance of a second air gap formed by the prisms 15c and 15d. In this embodiment, the focus obscurity which resulted in the example of FIG. 5 is not produced. The rays d, e and f are aligned so that they focus just on the optical axis even after passing through the prisms 15a, 15b′, 15c and 15d. In this example, the shift of the image on the image pick up device is not produced.

The operation of the second embodiment will now be the ray d enters the prism 15a along the optical axis and the rays e and f enter the prism 15a at an angle to the optical axis similar to the rays b and c in FIG. 5. The amount of the shift of the rays d, e and f on account of the first and second air gap depends only on the air gap distance d and an exit angle of the rays from the exit prism surface to the air gap. The amount of the shift for rays at an angle to the optical axis, when passing through the prisms is equal for all the prisms 15a, 15b′, 15c and 15d. From the above the ray d which is shifted by $\epsilon$ on account of the first air gap, is shifted reversely by $\epsilon$ on account of the second air gap. As to the rays e and f, the amount of the shift of the ray e on account of the first air gap is equal to the amount of the shift of the ray f on account of the second air gap. And the amount of the shift of the ray f on account of the first air gap is equal to the amount of the shift of the ray e on account of the second air gap. That is, the total amount of the shifts of the ray e on account of the first and the second air gaps, is equal to the total amount of the shifts of the ray f on account of the first and the second air gaps. Therefore, the ray e and the ray f which pass through all the prisms cross on the optical axis. As a result, all the rays d, e and f cross at the same point x on the optical axis, therefore the phenomena of the obscure image and the shift of the image as shown in FIG. 5 are not produced.

As another embodiment of the variable optical path length means, when a lighter, smaller and vibration-resistant imaging pick up device such as a solid state imaging apparatus is used, the image pick up device itself can be vibrated in the direction of the optical axis to vary the optical path length.

The embodiment of this present invention does not need much electric power and can realize high speed and slight vibration and has a simple construction.

Figure 7:
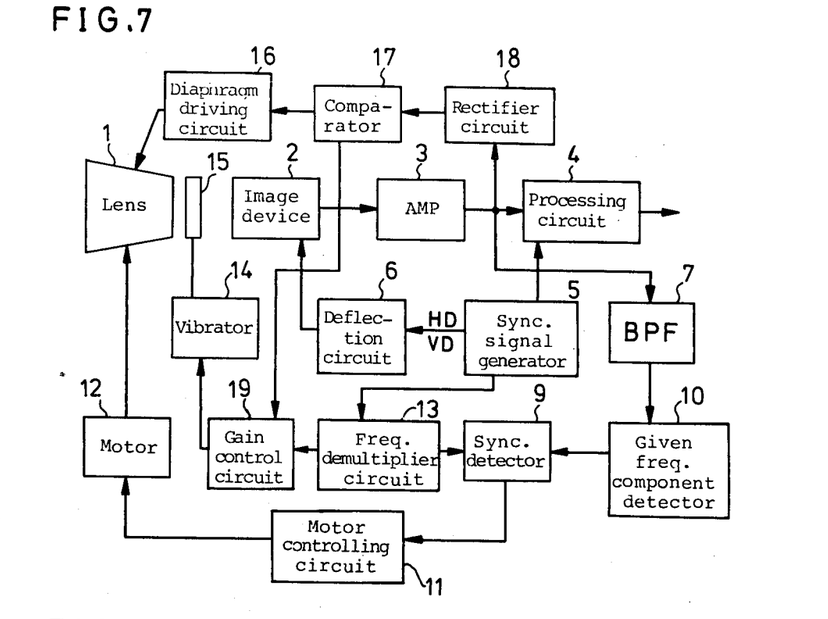
FIG. 7 is a block diagram showing another embodiment of the present invention when the variable optical path length means is controlled corresponding to the state of a lens diaphragm.

An example of a circuit to obtain the stability of a feedback loop for focussing independently of a state of the lens diaphragm is elucidated with reference to FIG. 7 and thereafter.

When a diaphragm is open to its maximum opening or thereabout, the depth of field is shallow, therefore the variation of the amplitude of the high frequency component is sufficiently large for the small variation of optical path length. However, when the diaphragm is closed, the depth of field becomes deep, and the variation of the amplitude of the high frequency component becomes small. Therefore, a gain for negative feedback becomes small and the stability of the feedback loop becomes worse.

Figure 8:
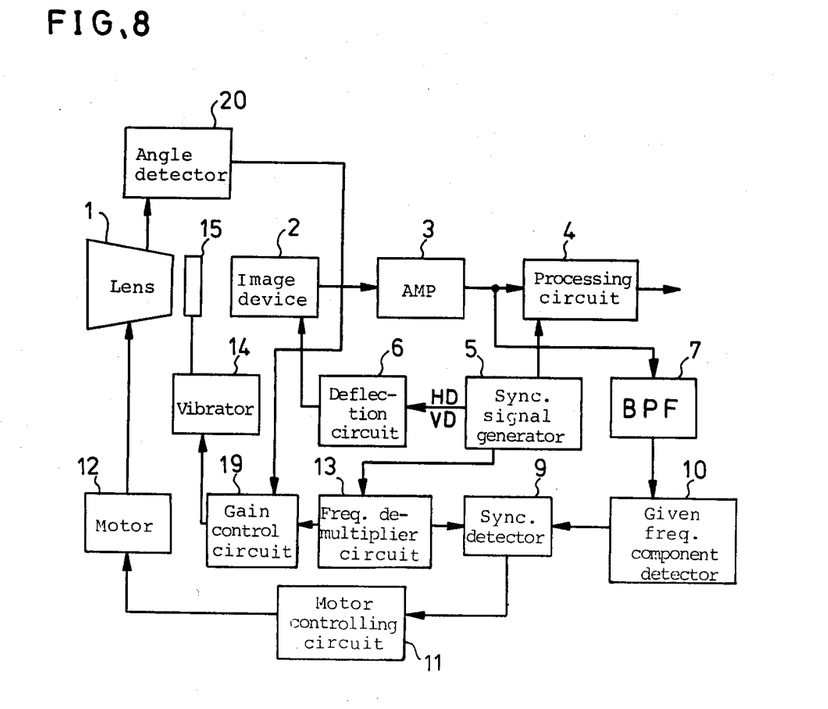
FIG. 8 is a block diagram showing still another embodiment of the present invention when the variable optical path length means is controlled corresponding to the state of a lens diaphragm.

For preventing the unstability, by varying the amplitude of the vibration of the vibrator corresponding to a detected state of the lens diaphragm, a necessary amount of the variation of the amplitude of the high frequency component is obtained. An embodiment of a circuit for such operation is shown in FIG. 7 and FIG. 8. In FIG. 7, the parts 1 to 7 and 9 to 15 correspond to the parts 1 to 7 and 9 to 15 in FIG. 3, respectively.

A rectifier circuit 18, a comparator 17 and a diaphragm driving circuit 16 constitute an automatic diaphragm circuit. The rectifier circuit 18 detects and smoothes the video signal issued from the pre-amplifier 3 and generally detects a mean value of the video signal. The comparator 17 compares a standard voltage with the output voltage issued from the rectifier circuit 18 and supplies an output in order to make the output voltage issued from the rectifier circuit 18 equal to the standard voltage, namely, comprises a negative feedback loop. The diaphragm driving circuit 16 drives the lens diaphragm in response to the output of the comparator 17. Therefore, the state of the lens diaphragm is obtained by the comparator 17 and the amount of the variation of the optical path length can be controlled by varying a gain of a gain control circuit 19 in accordance with the output of the comparator 17. That is, when the lens diaphragm is open to its maximum opening or thereabout the gain of the gain control circuit 19 becomes small, and when the lens diaphragm is closed the gain becomes large, so that the variation of the amplitude of the given frequency wave component, the variation of which is derived from the variation of the lens diaphragm, becomes small. FIG. 8 shows another embodiment in which the state of the lens diaphragm is detected directly. In FIG. 8, the parts 1 to 7 and 9 to 15 correspond to the parts 1 to 7 and 9 to 15, respectively of FIG. 3. The circuit 19 is a gain control circuit and angle detector 20 detects an angle of a diaphragm motor which controls the lens diaphragm mechanically. This angle detection is executed by using for example a Hall element. The gain control circuit 19 is controlled responsive to the output of the angle detector 20 so that the variation of the optical path length is controlled. That is, when the lens diaphragm becomes closed to some extent, the gain of the gain control circuit 20 increases and the variation of the optical path length becomes large, accordingly, this embodiment prevents the degree of obscurity of the image on the face of the image pick up device becomes too small to be detected.

Of course, even when the variation of the optical path length is large, the degree of obscurity of the image on the face does not increase and thus the obscurity of the image cannot be recognized by the human eye since the depth of field is deep.

According to the above-mentioned embodiment, the stability of the feedback loop for focussing is obtained independently of the state of the lens diaphragm.

Another embodiment will now be explained, whose range, within which the focussing can be executed, is increased so that the automatic focussing apparatus of the present invention is of practical use.

Figure 9:
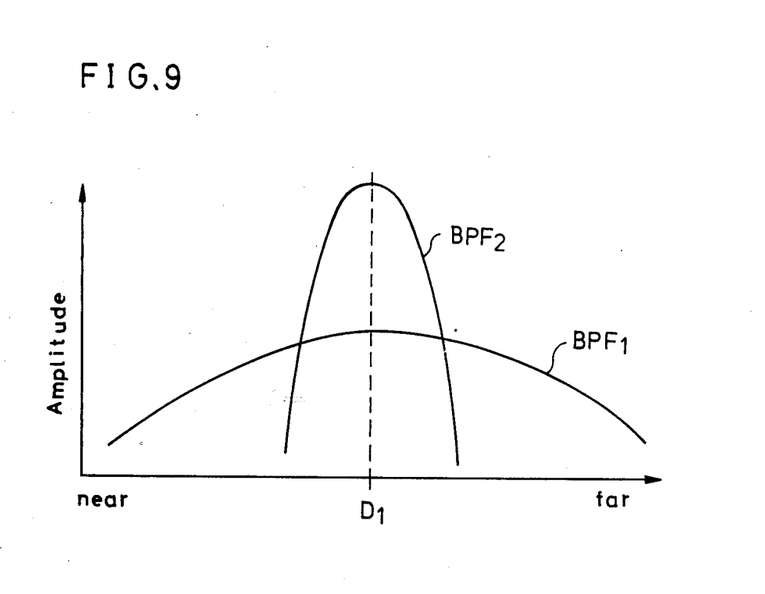
FIG. 9 is a characteristic view showing the amplitude of the output signal of the band-pass filters with respect to an amount of distance to the focussing position of the distance $D_1$.

In this embodiment, even if the lens 1 is far from the focussing position at the distance $D_1$, the output signal of a first band-pass filter BPF having a higher center frequency and the output signal of a second band-pass filter BPF having a lower center frequency are computed, and the direction for driving the lens 1 is derived from the computed result. Thereby, the lens 1 is shifted to a right focussing position of the distance $D_1$ so that the amplitude of the output signal of the first band-pass filter BPF having the higher center frequency becomes maximum. Thus erroneous operation is prevented. In FIG. 9, the characteristic of the second band-pass filter $BPF_1$ having the lower central frequency and the first band-pass filter $BPF_2$ having the higher center frequency are shown.

The characteristic curves of the second band-pass filter $BPF_1$ extends broadly, therefore the range within which the focussing can be executed is large. Accordingly, when the amplitude of the output signal of the first band-pass filter $BPF_2$ is small, the feedback operation is executed using the output signal of the second band-pass filter $BPF_1$. Additionally when the amplitude of the output signal of the first band-pass filter $BPF_2$ becomes larger than a predetermined value, the feedback operation is executed using the output signal of the first band-pass filter $BPF_2$.

Figure 10:
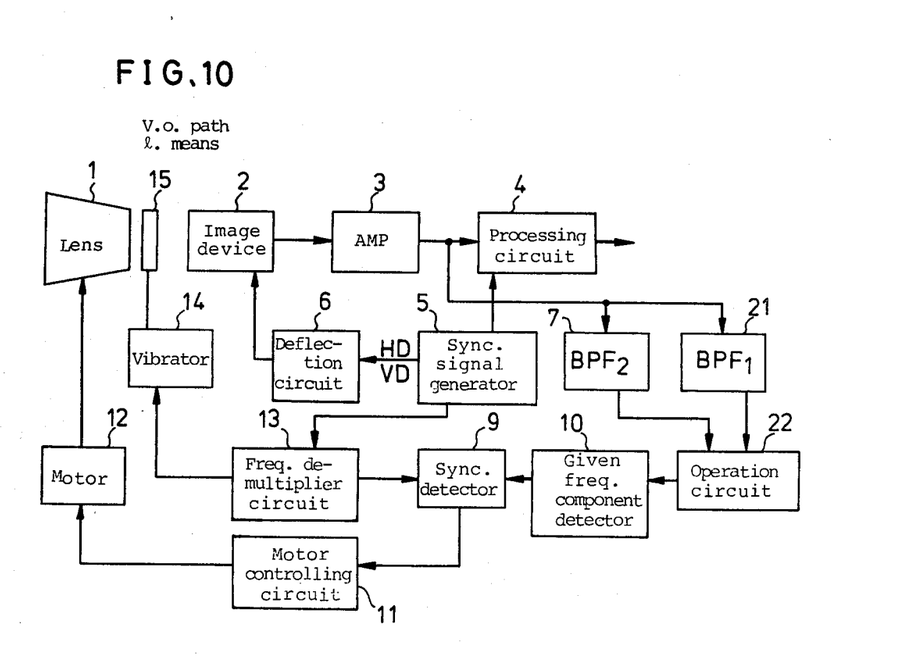
FIG. 10 is a block diagram showing another embodiment of the present invention using plural band-pass filters.

This embodiment is shown in FIG. 10. The parts 1 to 6 and 9 to 15 in FIG. 10 correspond to the parts 1 to 6 and 9 to 15 in FIG. 3, respectively. By varying the optical path length at a given frequency which is produced by the demultiplier circuit 13, which multiplies the vertical synchronization signal, by 1/n the high frequency component of the output signal of the image tube 2 is varied to an extent that the variation of the image on a cathode-ray tube is unrecognized by the human eye. The high frequency component is detected by the two band-pass filters 21 and 7 having different center frequencies from each other. The center frequency of one band-pass filter 21 is low, for example, 200 KHz to 1 MHz and the band-pass filter 21 has the characteristic shown by curve $BPF_1$ in FIG. 9. That is, the range within which the given frequency component can be detected is broad, but the sensitivity of the detection is not good, as compared to the band-pass filter. The center frequency of the other band-pass filter 7 is higher, for example, the band is 1.5 MHz to 2.5 MHz and the band-pass filter 7 has the characteristic shown by $BPF_2$ in FIG. 9. That is, the range within which the given frequency component can be detected is narrow but the sensitivity of the detection is high as compared to the band-pass filter 21. The operation circuit 22 operates such that when the lens is largely out of focus and the image on the face of the image pick up device is obscure, the feedback operation is executed by using the output of the band-pass filter 21 since the output of the band-pass filter 7 is very low. On the other hand, when the output of the band-pass filter 7 becomes larger than a predetermined value, the feedback operation is executed by using the output of the band-pass filter 7.

Figure 11:
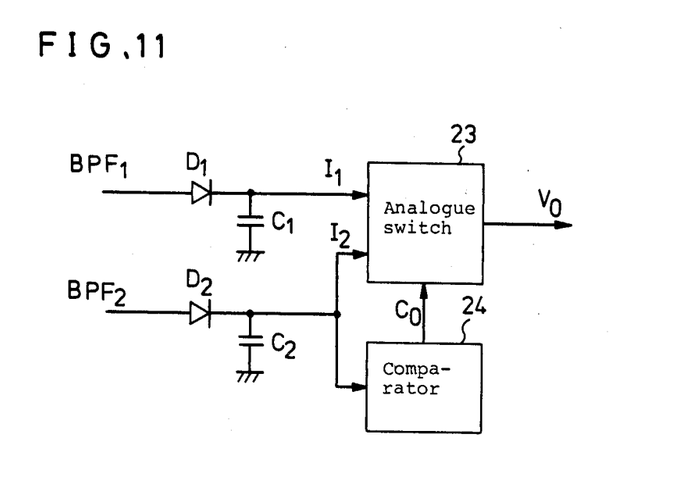
FIG. 11 is a circuit showing an embodiment of the operation circuit to which the output of the band-pass filters in FIG. 10 is supplied.
Figure 12:
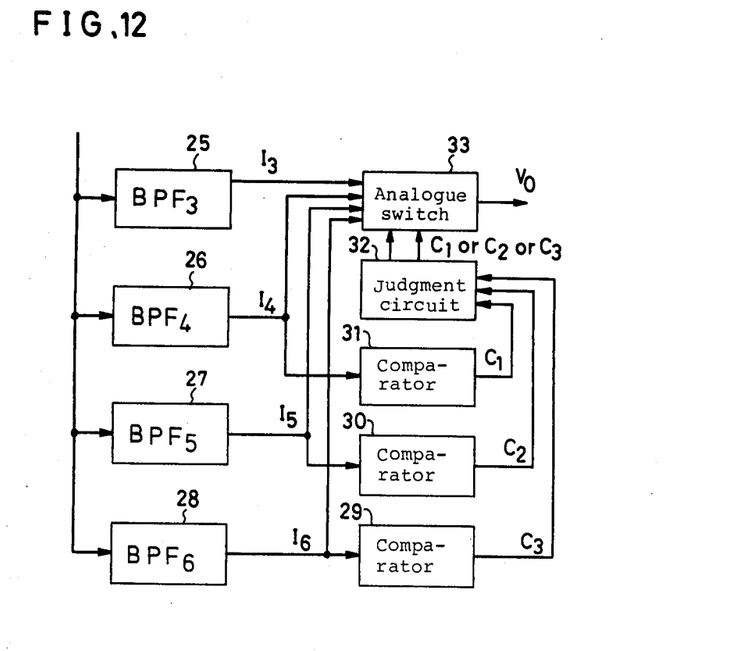
FIG. 12 is a circuit showing still another embodiment of the operation circuit to which the output of the band-pass filters in FIG. 10 is supplied.

The operation circuit 22 is shown in detail in FIG. 11. The diodes $D_1$ and $D_2$ and the capacitors $C_1$ and $C_2$ constitute a peak rectifier circuit which rectifies a peak voltage of the output of the band-pass filter $BPF_1$ and $BPF_2$ so that the given frequency component is demodulated. The comparator 24 issues an output signal $C_0$, which is high when the amplitude of the output of the band-pass filter $BPF_2$ becomes larger than a predetermined value. The analoge switch 23 supplies the input signal $I_2$ as its output signal, when the output signal $C_0$ of the comparator 24 becomes high. And the analoge switch 23 supplies the input signal $I_1$ as its output signal, when the output signal $C_0$ is low. Thus, when the output signal of the band-pass filter $BPF_2$ is low, the feedback operation is executed by using the output signal of the band-pass filter BPF$_1$, and when the output signal of the band-pass filter BPF$_2$ becomes larger than a predetermined amplitude value, the feedback operation is executed by using the output signal of the first band-pass filter BPF$_2$. For making the feedback operation more accurate, more than three band-pass filters may be used. This embodiment is shown in FIG. 12. The band-pass filters 25, 26, 27 and 28 have center frequencies different from each other and bands overlapping each other. The center frequencies of these band-pass filters 25, 26, 27 and 28 are higher in the order of their numerals. The comparators 29, 30 and 31 make their output signals C$_3$, C$_2$ and C$_1$ high when the output signal I$_6$, I$_5$ and I$_4$ of the band-pass filters 28, 27 and 26 become larger than predetermined values, respectively. The judgment circuit 32 causes the analoge switch 33 to issue a signal I$_6$ when the signal C$_3$ is high, no matter what the levels of signals C$_2$ and C$_1$ are. And the judgment circuit 32 causes the analog switch 33 to supply a signal I$_5$ when the signal C$_3$ is low and the signal C$_2$ is high, no matter what the level of signal C$_1$ is. And when the signals C$_3$, C$_2$ and C$_1$ are all low, the judgment circuit 32 causes the analogue switch 33 to supply a signal I$_3$. That is, for band-pass filters whose output signals are larger than predetermined values, the output signal of the band-pass filter having the highest center frequency among the these band-pass filters, is used in the feedback operation.

Figure 13:
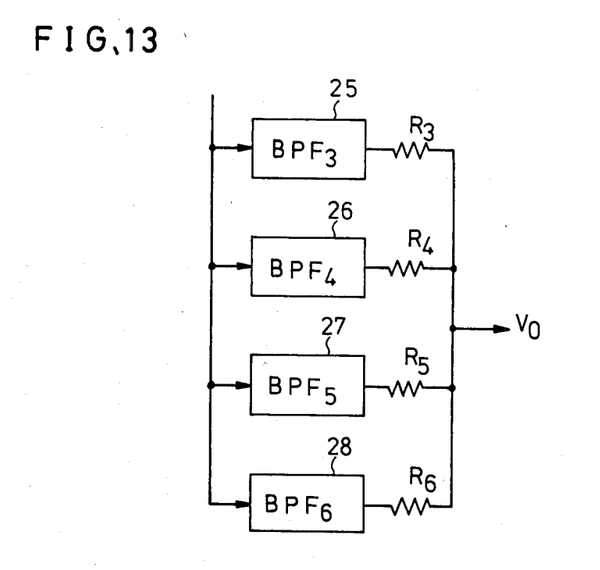
FIG. 13 is a circuit showing still another embodiment of the operation circuit to which the output of the band-pass filters in FIG. 10 is supplied.

Also, another embodiment of such an operation is shown in FIG. 13. The band-pass filters 25 to 28 have different center frequencies similarly to the band-pass filters of as the embodiment in FIG. 12. The output signals are added through the resistances R$_3$, R$_4$, R$_5$ and R$_6$. At the time, the output signal of the band-pass filter having the higher central frequency is given with a weight so that the output signal becomes larger. As a result, the embodiment realizes such feedback automatic focussing apparatus that as the lens 1 shifts to the focussing position of the distance D$_1$, the output signal of the band-pass filter having the higher center frequency becomes to have larger weight.

Another embodiment for expanding the range of the focussing without diminishing the focus accuracy will be described below.

Figure 14:
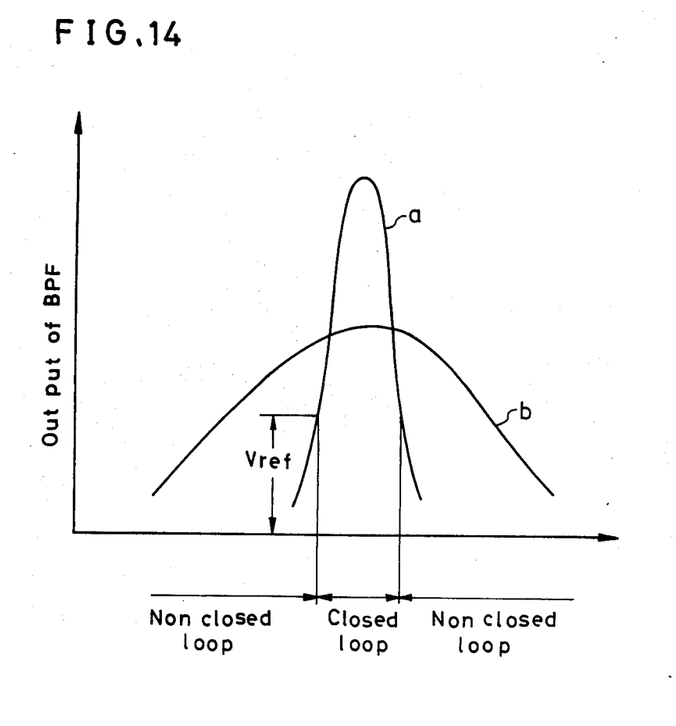
FIG. 14 is a characteristic view showing the amplitude of the output signal of the band-pass filters with respect to an amount of distance to the focussing position of the distance $D_1$.

The outline of the embodiment is shown in FIG. 14, which shows output level curve "a" of the first band-pass filter BPF$_2$ having the higher center frequency and the output level curve "b" of the second band-pass filter BPF$_1$ having the lower center frequency, with respect to the amount of the shift from focussing position of the distance D$_1$. In this embodiment, only when the output level of the first band-pass filter BPF$_2$ is larger than the reference level V$_{ref}$, will the closed feedback operate by using the output of the first band-pass filter BPF$_2$. When the output of the first band-pass filter BPF$_2$ is lower than the level V$_{ref}$, the direction for focussing is judged by only using the output of the second band-pass filter BPF$_1$, and the lens 1 is shifted by using open loop control until the output of the band-pass filter BPF$_2$ becomes larger than the level V$_{ref}$. That is, the accuracy of the focussing is given by means of the closed feedback loop using the output of the first band-pass filter BPF$_2$, and extention to a wide range of focussing can be executed by using the output of the second band-pass filter BPF$_1$. Furthermore, when judging the direction by using the output of the first band-pass filter BPF$_1$, the lens 1 can be shifted rapidly since the open loop control is used.

Figure 15:
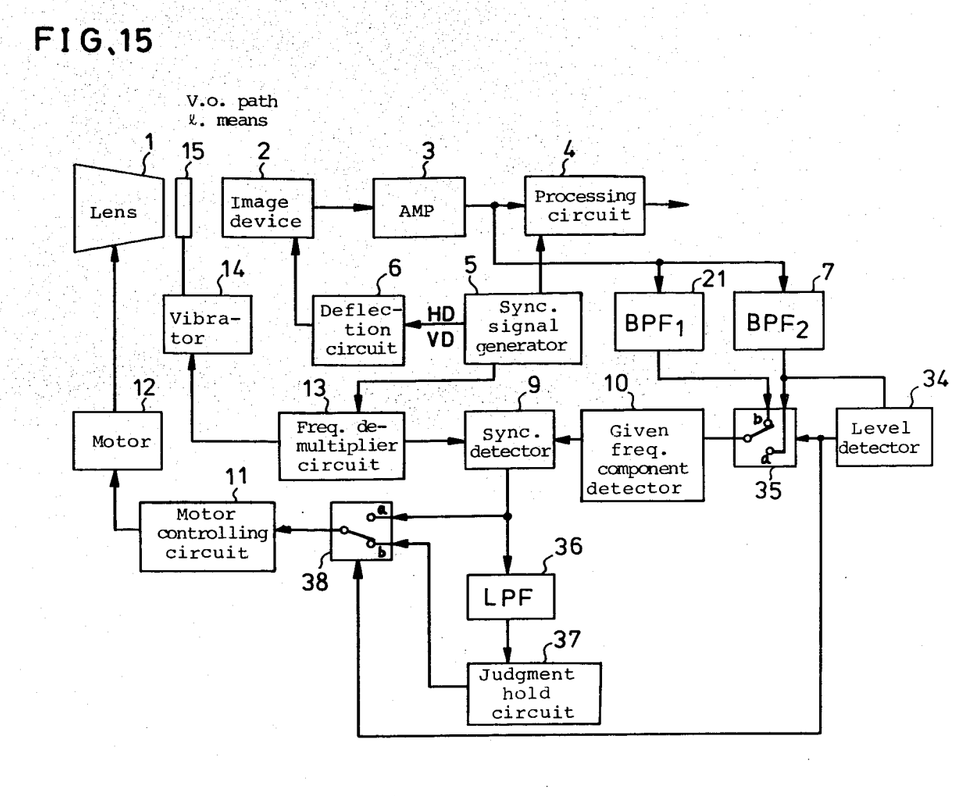
FIG. 15 is a block diagram showing another embodiment of the present invention, using plural band-pass filters.

The embodiment is shown in FIG. 15 and the parts 1 to 7, 9 to 15 and 21 correspond to the parts 1 to 7, 9 to 15 and 21 in FIG. 10. The level detector 34 supplies an output signal when the output of the first band-pass filter BPF$_2$, having the high center frequency, is larger than the level V$_{ref}$, and the level detector 34 does not supply an output signal when the output of the first band-pass filter BPF$_2$ is smaller than the level V$_{ref}$. In the analoge switches 35 and 38, each terminal "a" is turned on when the output signal of the level detector 34 is supplied and turned off when the output signal of the level detector 34 is not supplied. The judgment hold circuit 37 judges whether the output of the low-pass filter 36 is positive or negative and issues signal +V$_M$ or signal −V$_M$, according to the output of the low-pass filter 36 and holds the signal +V$_M$ or signal −V$_M$.

When the lens 1 is shifted largely from the focussing position of the distance D$_1$ and the output of the first band-pass filter BPF$_2$ is smaller than the value V$_{ref}$, the level detector 34 does not issue a signal, and accordingly the terminals b of the analoge switches 35 and 38 are on. Therefore, the synchronization detector 9 detects the given frequency component of the output of the second band-pass filter BPF$_1$, having the lower center frequency, using the given frequency issued from the demultiplier circuit 13. The output of the synchronization detector 9 is averaged by the low-pass filter LPF 36 and the low-pass filter LPF 36 supplies a positive or a negative DC offset, corresponding to a direction for focussing. This DC offset is converted to DC voltage +V$_M$ or DC voltage −V$_M$ by the judgment hold circuit 37, and the DC voltage ±V$_M$ is held. The DC voltage ±V$_M$ shifts the lens 1 to the direction for focussing through the analoge switch 38. When the lens 1 is shifted near the focus position of the distance D$_1$ and the output of the first band-pass filter BPF$_2$ 7 becomes larger than the value V$_{ref}$, the level detector 34 issues an output, and the terminals a of analogue switch 35 and 38 are closed. Therefore, in this case the closed feedback loop using the output of the first band-pass filter BPF$_2$ is formed.

Figure 16:
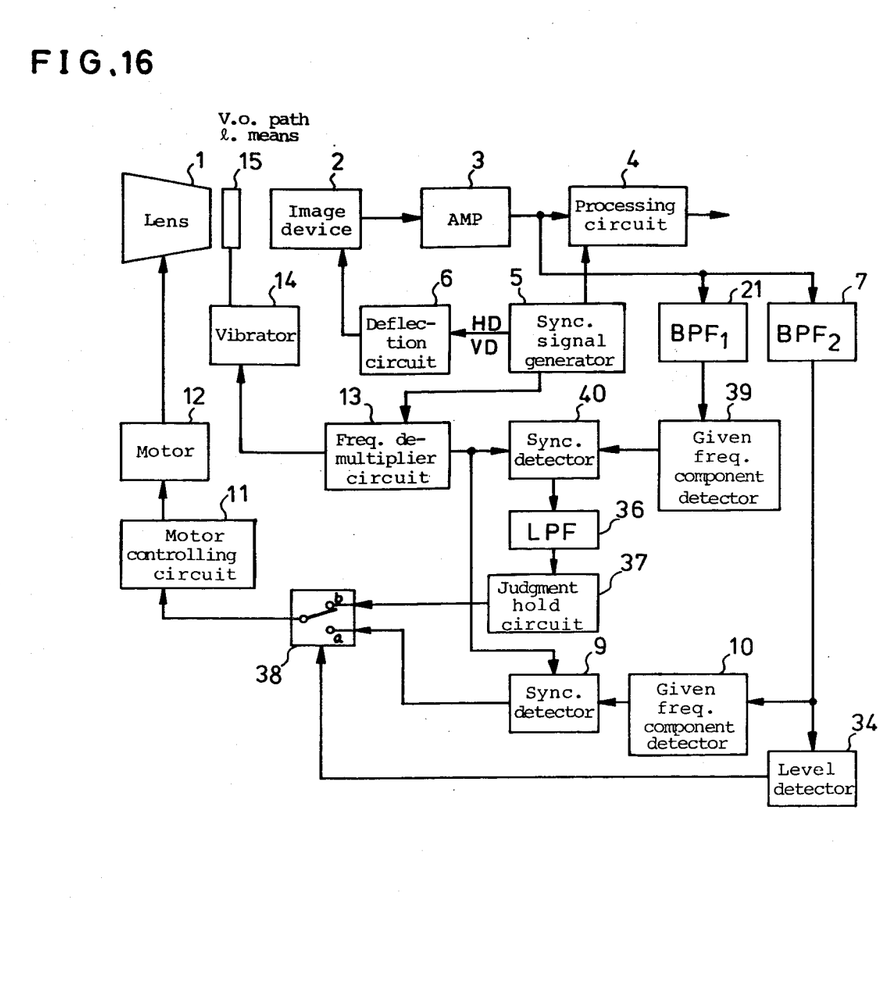
FIG. 16 is a block diagram showing still another embodiment of the present invention, using plural band-pass filters.

A further embodiment using an open control loop and a closed feedback loop is shown in FIG. 16. The parts 1 to 7, 9 to 15, 21, 34 and 36 to 38 correspond to the parts 1 to 7, 9 to 15, 21, 34 and 36 to 38 in FIG. 15, respectively. The difference between the embodiment of FIG. 15 and the embodiment of FIG. 16 is that in FIG. 16 the analoge switch 35 is omitted and a further given frequency component detector 39 and a further synchronization detector 40 are connected to the output terminal of the second band-pass filter BPF$_1$ 21 and the low-pass filter LPF 36 and the judgment hold circuit 37 are connected to the output terminal of the synchronization detector 40. That is, the open loop system for judgment of the direction and the closed feedback loop system for focussing are provided independently and the input to the motor controlling circuit 11 is exchanged only by using the level detector 34 and the analoge switch 38. This embodiment of FIG. 16 is advantageous because it is unnecessary to consider a transient state which occurs when the outputs of the second band-pass filter BPF$_1$ and BPF$_2$ are with each other, as in the embodiment of FIG. 15, and accordingly the operation is stable.

According to the embodiments, shown in FIG. 9 to FIG. 16, which use plural band-pass filters, an automatic focussing apparatus, which has a large focussing range and which is highly accurate in focussing can be achieved.

Incidentally, the method using the state of the lens diaphragm in FIG. 7 and FIG. 8, and the method using plural band-pass filters in FIG. 9 to FIG. 16 can be applied to the conventional automatic focussing apparatus which vibrates the image lens.

As mentioned above, since the feedback-type automatic focussing apparatus of the present invention modulates the high frequency component of the electric image signal issued from the image tube or the solid state imaging apparatus, by making the optical object image on the image device, vibrate out of focus according to the given frequency, which is 1/n as large as the frequency of the vertical synchronization signal of the standard television (n is an integer larger than 2), erroneous focussing operation does not occur.

As mentioned above, according to the present invention, the feedback automatic focussing apparatus consuming little power and having a high reliability can be provided. And further, the focussing range can be considerably expanded.

Since the lens is included in this feedback loop, the accuracy and the stability of the lens itself does not matter. And further, because the lens can be made of plastic light material, the advantages of this invention are great.

What is claimed is:

1. An automatic focussing apparatus having an image pick-up device, a lens and an associated focus setting device, said apparatus comprising:
   focus modulating means for cyclically modulating a focus setting on an imaging receiving surface of said image pick-up device,
   first driving means for driving said focus modulating means in response to a signal of a given frequency which is 1/n as large as a frequency of a vertical synchronization signal of a standard television signal, where n is an integer larger than 2,
   a plurality of band-pass filters having different center frequencies and different reference levels from one another, said plurality of band-pass filters filtering a video signal derived from said image pick-up device,
   detecting means for detecting a component of said given frequency from an output of one of said plurality of band-pass filters by means of an envelope detection method,
   synchronous detecting means for obtaining a focus control signal including a polarity and an amplitude, by means of a synchronous detection method utilizing said given frequency component and said given frequency,
   second driving means for controlling said focus setting device of said lens in response to said focus control signal, and
   selecting means for determining said focus control signal to be an output signal of one of said plurality of band-pass filters which has the highest center frequency among those of said plurality of band-pass filters having a larger output than their associated reference level.

2. An automatic focussing apparatus in accordance with claim 1, wherein said selecting means selects one of said outputs of said plurality of band-pass filters for inputting to said detecting means.

3. An automatic focussing apparatus in accordance with claim 1, further comprising:
   at least one additional detecting means wherein each one of said detecting means is connected to one of said plurality of band-pass filters, and
   said selecting means selects one of said outputs of said detecting means for inputting to said synchronous detecting means.

4. An automatic focussing apparatus in accordance with claim 1, further comprising:
   at least one additional detecting means wherein each one of said detecting means is connected to one of said plurality of band-pass filters, and
   at least one additional synchronous detecting means for obtaining at least one additional focus control signal wherein each one of said synchronous detecting means is connected to only one of said detecting means and said at least one additional detecting means, wherein said selecting means selects between said focus control signal and said at least one additional focus control signal for inputting to said second driving means.

5. An automatic focussing apparatus in accordance with claim 1, wherein:
   said image pick-up device is a solid state image sensor,
   said focus modulating means vibrates said solid state image sensor substantially in an optical axis direction.

6. An automatic focussing apparatus in accordance with claim 1, wherein:
   said focus modulating means is disposed between said lens and said image pick-up device,
   said focus modulating means comprises a first optical prism, a second optical prism and a vibrator,
   said first optical prism and said second optical prism have vertex angles of equal size,
   said first optical prism and said second optical prism are combined in a manner that an incident surface of said first optical prism and an exit surface of said second optical prism are perpendicular to the optical axis and an exit surface of said first optical prism and an incident surface of said second optical prism are parallel to each other,
   a distance between said exit surface of said first optical prism and said incident surface of said second optical prism is smaller than 1 mm, and
   said vibrator vibrates at least one of said first optical prism and said second optical prism in the direction of said vertex angle of said prisms in a manner that said distance is maintained constant.

7. An automatic focussing apparatus having a lens, an image pick-up device, and a focus setting on an image receiving surface of said image pick-up device, said apparatus comprising:
   focus modulating means for cyclically modulating said focus setting on said imaging receiving surface of said image pick-up device,
   first driving means for driving said focus modulating means in response to a signal of a given frequency which is 1/n as large as a frequency of a vertical synchronization signal of a standard television signal, where n is an integer larger than 2,
   a plurality of band-pass filters, which have different center frequencies from one another, said plurality of band-pass filters filtering a video signal derived from said image pick-up device, each one of said plurality of band-pass filters having its own reference level, detecting means for detecting a component of said given frequency from an output of one of said plurality of band-pass filters by means of an envelope detection method, synchronous detecting means for obtaining a focus control signal including a polarity and an amplitude, by means of a synchronous detection method utilizing said given frequency component and said given frequency, second driving means for controlling said focus setting device of said lens in response to said focus control signal, first selecting means for determining said focus control signal to be an output signal of one of said plurality of band-pass filters which has the highest center frequency among those of said plurality of band-pass filters having a larger output than their associated reference level, judgment hold means which detects a polarity of an average of said focus control signal and holds an output signal having a binary value and being positive or negative dependent upon said polarity of said average of said focus control signal, and second selecting means for selecting said output signal of said binary value and inputting it to said second driving means only when said output of one of said plurality of band-pass filters having the lowest central frequency is larger than its associated reference level, and in all other cases said second selecting means selecting said focus control signal determined by said first selecting means and inputting it to said second driving means.

8. An automatic focussing apparatus in accordance with claim 7, further comprising at least one additional detecting means wherein each one of said plurality of band-pass filters is connected to only one of said detecting means and said at least one additional detecting means and wherein said judgement hold circuit is connected to said synchronous detecting means, said first selecting means selects one of said outputs of said detecting means and inputs it to said synchronous detecting means, and said second selecting means selects either an output of said synchronous detecting means or an output of said judgment hold circuit and inputs it to said second driving means.

9. An automatic focussing apparatus in accordance with claim 7, further comprising:

at least one additional detecting means and wherein a first detecting means is connected to one of said plurality of band-pass filters having the lowest central frequency, at least one additional synchronous detecting means and wherein a first synchronous detecting means is connected to said first detecting means, said judgement hold circuit is connected to said first synchronous detecting means, and wherein each of the other of said detecting means is connected to the others of said plurality of band-pass filters, respectively, said first selecting means selects one of said outputs of said detecting means other than said first detecting means, making it enter into said second synchronous detecting means, and said second selecting means selects either said output of said judgment hold circuit or said output of said second synchronous detecting means, making said selected output enter into said second driving means.

10. An automatic focussing apparatus in accordance with claim 7, wherein said image pick-up device is a solid state image sensor, said focus modulating means vibrates said solid state image sensor substantially in an optical axis direction.

11. An automatic focussing apparatus in accordance with claim 7, wherein said focus modulating means is disposed between said lens and said image pick-up device, said focus modulating means comprises a first optical prism, a second optical prism and a vibrator, said first optical prism and said second optical prism have vertex angles of equal size, said first optical prism and said second optical prism are combined in a manner than an incident surface of said first optical prism and an exit surface of said second optical prism are perpendicular to the optical axis and an exit surface of said first optical prism and an incident surface of said second optical prism are parallel to each other, a distance between said exit surface of said first optical prism and said incident surface of said second optical prism is smaller than 1 mm, and said vibrator vibrates said first optical prism and said second optical prism in the direction of said vertex angle of said prisms in a manner that said distance is maintained constant.

* * * * *